US008604638B2

(12) United States Patent
Incerpi

(10) Patent No.: US 8,604,638 B2
(45) Date of Patent: Dec. 10, 2013

(54) POWER DISTRIBUTION APPARATUS

(75) Inventor: Gian Carlo Incerpi, Steeple Claydon (GB)

(73) Assignee: Safran Power UK Ltd. (GB)

( * ) Notice: Subject to any disclaimer, the term of this patent is extended or adjusted under 35 U.S.C. 154(b) by 536 days.

(21) Appl. No.: 12/915,860

(22) Filed: Oct. 29, 2010

(65) Prior Publication Data

US 2011/0101773 A1    May 5, 2011

(30) Foreign Application Priority Data

Oct. 30, 2009   (GB) .............................. GB0919041.4

(51) Int. Cl.
*B60L 1/00* (2006.01)
*B60L 3/00* (2006.01)
*H02G 3/00* (2006.01)

(52) U.S. Cl.
USPC ......................................................... 307/9.1

(58) Field of Classification Search
USPC .............................. 307/9.1, 19; 244/60, 134 D
See application file for complete search history.

(56) References Cited

U.S. PATENT DOCUMENTS

| 2006/0102790 | A1* | 5/2006 | Atkey et al. ............... 244/134 R |
| 2007/0259545 | A1 | 11/2007 | Berenger |
| 2010/0283319 | A1* | 11/2010 | Boudyaf et al. ............... 307/9.1 |

FOREIGN PATENT DOCUMENTS

| EP | 1852953 | 11/2007 |
| EP | 1953085 | 8/2008 |
| FR | 2907762 | 5/2008 |
| WO | 2004037641 | 5/2004 |

OTHER PUBLICATIONS

European Search Report dated Mar. 23, 2011.
GB Search Report dated Mar. 12, 2010.
English translation of Abstract for EP 1 953 085, Nov. 19, 2010.

* cited by examiner

*Primary Examiner* — Carlos Amaya
(74) *Attorney, Agent, or Firm* — Cantor Colburn LLP

(57) ABSTRACT

A power distribution apparatus 30 comprises an outboard distribution unit 36, an inboard distribution unit 32, a feeder cable 34 electrically interconnecting the inboard and outboard distribution units 32, 36, a generator line 40 whereby a generator output can be supplied, in use, to the outboard distribution unit 36, and switch means C1, C3, C5 operable to control the electrical connections between the feeder cable 34 and the inboard and outboard distribution units 32, 36 and between the generator line 40 and the outboard distribution unit 36.

11 Claims, 2 Drawing Sheets

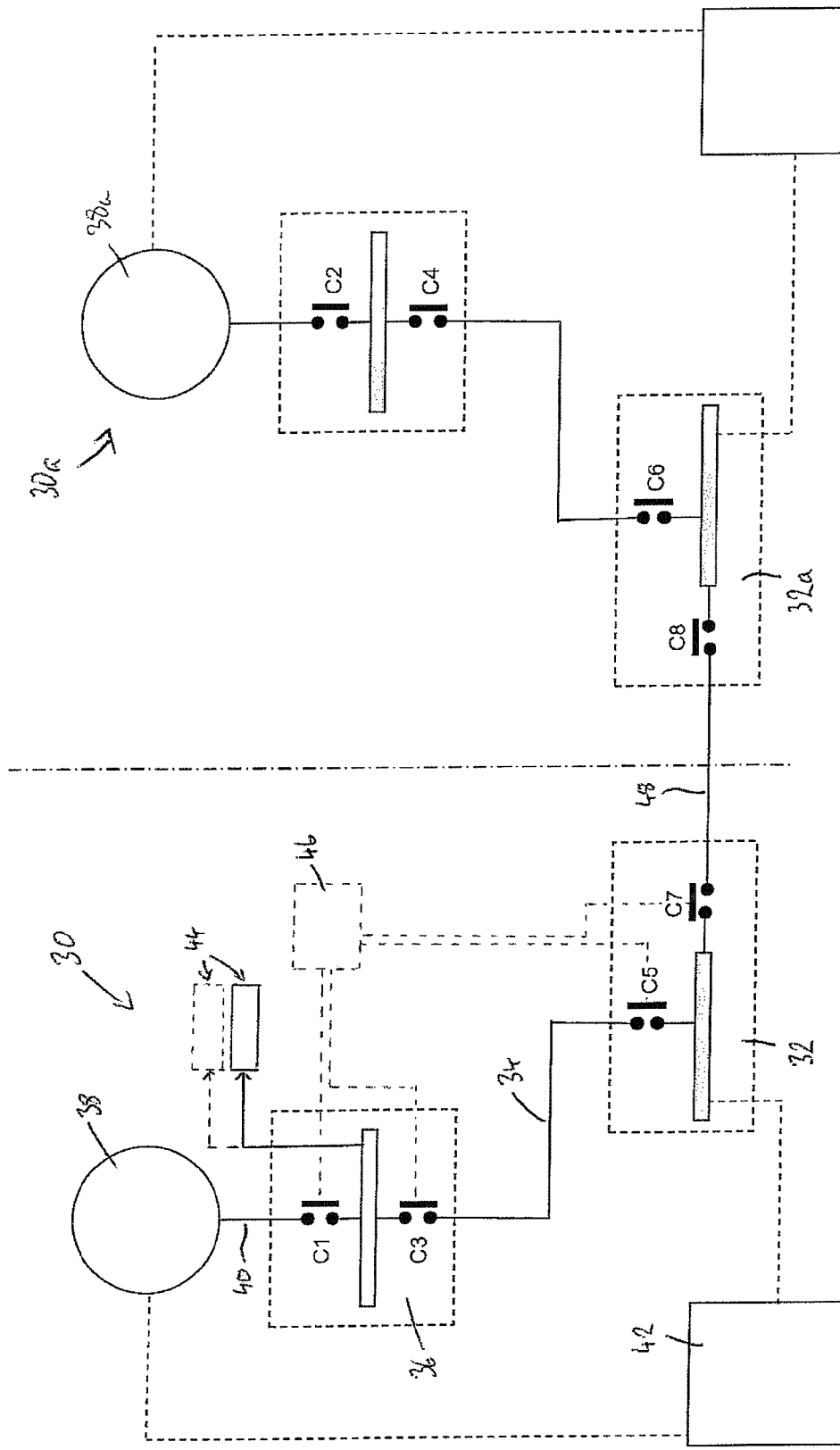

POWER DISTRIBUTION APPARATUS

CROSS REFERENCE TO RELATED APPLICATIONS

Not applicable.

BACKGROUND OF THE INVENTION

This invention relates to a power distribution apparatus, and in particular to a power distribution apparatus suitable for use on an aircraft.

A multi-engined aircraft typically has one or more electrical generators mounted to and arranged to be driven by each of the aircraft's engines. The operation of each generator is usually controlled by a fuselage mounted generator control unit. Electrical power generated by the generators is transmitted along long, heavy feeder cables to a power distribution panel which is also typically fuselage mounted.

The electrical loads of wing or nacelle located equipment of modern aircraft are increasing as electrical power is used in the actuation and control of a number of wing located devices, and electrical power is also increasingly being used in de-icing equipment. Long, heavy feeder cables are thus required to carry electrical power from the power distribution panel to such equipment. The power requirements of such equipment are high, with the result that the feeder cables are of large dimensions, and the need to provide redundancy results in the feeder cables contributing significantly to the aircraft weight, for example they may weigh a couple of hundred kilograms.

In order to improve the efficiency of aircraft it is desired to reduce weight, where possible, and it is an object of the invention to provide a power distribution apparatus whereby a weight reduction can be achieved.

BRIEF SUMMARY OF THE INVENTION

According to the present invention there is provided a power distribution apparatus comprising an outboard distribution unit, an inboard distribution unit, a feeder cable electrically interconnecting the inboard and outboard distribution units, a generator line whereby a generator output can be supplied, in use, to the outboard distribution unit, and switch means operable to control the electrical connections between the feeder cable and the inboard and outboard distribution units and between the generator line and the outboard distribution unit.

As, in normal use, power is supplied to the inboard distribution unit via the outboard distribution unit, it will be appreciated that electrical loads can be connected to the outboard distribution unit to be supplied therefrom without requiring the provision of a dedicated supply feeder cable to supply power from the inboard distribution unit. By avoiding the provision of such a feeder cable, a significant weight saving can be made.

Preferably, the switch means are controllable to allow operation in a first operating mode in which power is supplied to the inboard distribution unit via the outboard distribution unit, a second operating mode in which power is supplied from the inboard distribution unit to the outboard distribution unit, and a third mode in which no power is supplied between the inboard and outboard distribution units.

The inboard distribution unit is preferably located within an aircraft fuselage, the outboard distribution unit being located in or associated with a nacelle of the aircraft.

Preferably, one or more nacelle and/or wing located electrical loads are supplied from the outboard distribution unit.

The nacelle and/or wing located loads preferably include control and/or drive for an actuator, or operation of de-icing equipment.

Preferably, a switchable connection is provided between the inboard distribution unit and an inboard distribution unit of a second similar power distribution apparatus. Such an arrangement allows operation in a mode in which a generator associated with the second power distribution apparatus can be used to supply electrical power to equipment connected to the inboard and outboard distribution units of the first mentioned power distribution apparatus.

The invention will further be described, by way of example, with reference to the accompanying drawings, in which:

BRIEF DESCRIPTION OF THE SEVERAL VIEWS OF THE DRAWINGS

FIG. 2 illustrates, similarly, a power distribution apparatus in accordance with an embodiment of the invention.

DETAILED DESCRIPTION OF THE INVENTION

Figure 1:
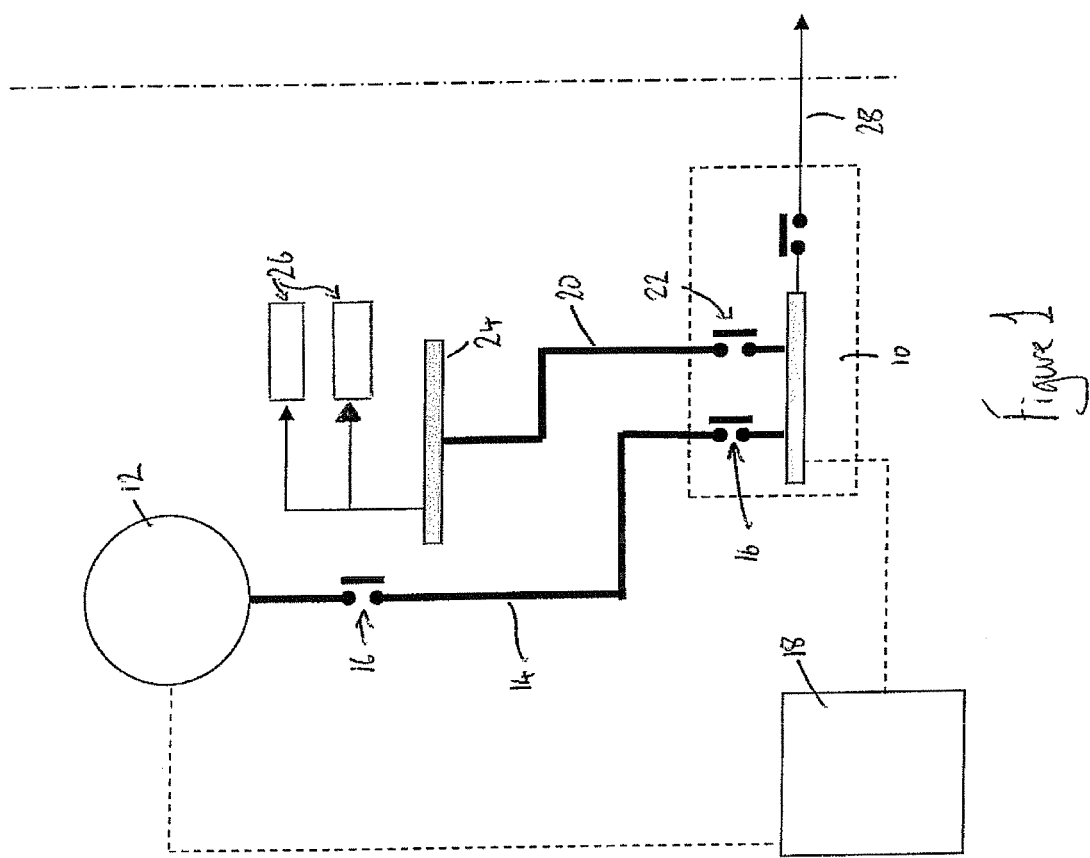
FIG. 1 is a simplified diagrammatic view illustrating a typical power distribution 30 apparatus.

The power distribution apparatus illustrated in FIG. 1 comprises an inboard power distribution unit 10 located, in use, in the fuselage of an aircraft and arranged to be supplied with electrical power from an electrical generator 12. The generator 12 is arranged to be driven by, and hence is located at the location of, a wing mounted engine of the aircraft, and thus is located remotely of the inboard power distribution unit 10. A feeder cable 14 provides electrical connections between the generator 12 and the inboard power distribution unit 10. As illustrated, the feeder cable 14 is provided with switches or the like which can be used to disconnect the feeder cable 14 from the generator 12 and/or the inboard power distribution unit 10 should this be desired.

A generator control unit 18 is connected to both the inboard power distribution unit 10 and to the generator 12 and serves to control the operation of the generator 12 to ensure that the power requirements of loads connected to the inboard power distribution unit 10 are met.

A second, return feeder cable 20 is connected to the inboard power distribution unit 10 via a switch 22. The second feeder cable 20 connects a nacelle located power bus 24 to the inboard power distribution unit 10, and a series of electrical loads 26 are connected to the power bus 24 to receive power therefrom. The loads 26 are typically in the form of nacelle or wing located electrical devices, for example actuators used to control the positions of nacelle or wing located components, the control arrangements used in controlling the operation of such actuators, wing or nacelle de-icing equipment, or a number of other components.

A switched connection 28 allows the inboard power distribution unit 10 to be connected to a similar inboard power distribution of a second power distribution apparatus.

In normal use, electrical power is produced by the generator 12 and supplied via the feeder cable 14 to the inboard distribution unit 10. The electrical loads 26 are supplied with electrical power from the power distribution unit 10 via the second feeder cable 20 and bus 24. In the event of a failure within the generator 12 or damage to the feeder cable 14 preventing it from conducting electrical power from the generator 12 to the power distribution unit 10, then the switched connection 28 can be used to allow the power supply requirements of the loads 26 to be met using the generator of the second power distribution apparatus.

The feeder cables 14, 20 are of relatively large dimensions in order to minimize resistance and avoid significant voltage drops. The location of the generator 12 and power bus 24 remotely from the inboard distribution unit 10 requires the feeder cables 14, 20 to be of long length. Further, the need to accommodate redundancy so as to ensure that the power supply to the loads 26 can be maintained in the event of failures, results in the power distribution apparatus being heavy. It is desirable to reduce the weight of the power distribution apparatus whilst maintaining the required level of redundancy to ensure that safety levels are maintained.

FIG. 2 illustrates a power distribution apparatus 30 in accordance with an embodiment of the present invention. The apparatus 30 comprises an inboard, fuselage located, power distribution unit 32 connected by a feeder cable 34 to an outboard power distribution unit 36 located in the engine pylon or nacelle. The outboard distribution unit 36 is connected to a generator 38 via a generator line 40. As with the arrangements shown in FIG. 1, a generator control unit 42 is connected to both the generator 38 and the inboard power distribution unit 32 in order to regulate and control the operation of the generator 38.

A series of nacelle and/or wing located electrical loads 44 are electrically connected to the outboard power supply unit 36.

Switch means are provided to control the electrical connections between the generator line 40 and the outboard distribution unit 36 and between the feeder cable 34 and the inboard and outboard power distribution units 32, 36. The switch means comprise a first switch C1 which, when closed, connects the generator line 40 to the outboard distribution unit 36, a switch C3 which, when closed, connects the feeder cable 34 to the outboard distribution unit 36 and a Switch C5 which, when closed, connects the feeder cable 34 to the inboard power distribution unit 32. A switch control unit 46 controls the operation of the switches C1, C3, C5. The control unit 46 further controls the operation of a switch C7 which controls the connection of the inboard distribution unit 32 to a connection line 48 which can be used to connect the inboard distribution unit 32 to an inboard distribution unit 32a of a second, similar power supply apparatus 30a (only parts of which are shown).

In normal use the generator 38 supplies electrical power to the outboard distribution unit 36 which, in turn, supplies power via the feeder cable 34 to the inboard power distribution unit 32. In addition, the outboard power distribution unit 36 delivers or transfers power to the wing or nacelle located loads 44. As the provision of a second feeder cable is avoided, it will be appreciated that the power distribution apparatus of the arrangement of FIG. 2 can be of reduced weight compared to a typical power distribution apparatus. The weight savings do not reduce the level of redundancy within the power distribution apparatus 30 as, in the event of a failure within the generator 38, the switch C1 can be opened and the switch C7 closed with the result that power generated by the generator 38a of the second power distribution apparatus 30a can be supplied to the inboard distribution unit 32 and, via the feeder cable 34, to the outboard distribution unit 36 to ensure that the supply of electrical power to the loads 44 is maintained.

In the event of a failure within the feeder cable 34, for example arising from damage thereto causing a short circuit, the switches C3 and C5 may be opened to disconnect the feeder cable 34 from the inboard and outboard distribution units 32, 36. The generator 38 can be used to supply electrical power to the outboard distribution unit 36 and thereby ensure the continued supply of power to the loads 44. Closing of the switch C7 can be used to allow the supply of power to the inboard distribution unit 32 from the second power distribution apparatus 30a to ensure the continued operation of any loads connected to the inboard power distribution 32.

As, in the arrangement of FIG. 2, the point of regulation of the power distribution apparatus 30 is the inboard power distribution unit 32, it will be appreciated that the loads 44 may experience slightly wider voltage limits than would be the case if the loads were being powered using the apparatus illustrated in FIG. 1. The nature of the loads 44 will typically be such that they can accommodate such variations. However, should any of the loads 44 be of a type requiring a more regulated power supply, an additional, small, low power feeder cable may be provided to supply those loads from the inboard distribution unit 32. Any such loads are likely to be low power loads, for example in the form of control circuits for controlling the operation of other higher load pieces of equipment. The higher load pieces of equipment will typically be able to tolerate the wider voltage limits arising from using an unregulated power supply and so can be connected to the outboard distribution unit 36. It will be appreciated therefore that the additional feeder cable provided in such arrangements will be of relatively low weight, and so weight savings can still be achieved by the use of the invention.

In the arrangement described hereinbefore the switch means C1, C3 & C5 are all incorporated into the distribution units 32, 36. It will be appreciated, however, that arrangements are also possible in which one or more of the switch means C1, C3 & C5 are located externally of the distribution units 32, 36.

It will be appreciated that the description hereinbefore is merely of one example and that a number of modifications and alterations may be made to the arrangement described without departing from the scope of the invention.

The invention claimed is:

1. A power distribution apparatus comprising
    an outboard distribution unit having a first switch and a second switch;
    an inboard distribution unit having a third switch;
    a switch control unit coupled to each of the first, second, and third switches, the switch control unit being configured for selectively controlling each of the first, second, and third switches;
    a feeder cable electrically interconnecting the third switch with the second switch; and
    a generator line whereby a generator output can be supplied, in use, to the first switch of the outboard distribution unit;
    wherein in a first operating mode, the switch control unit selectively connects the first switch to the generator line and the second switch to the third switch to transfer power from the generator output via the outboard distribution unit to each of one or more nacelle and/or wing located electrical loads and aircraft fuselage electrical loads;
    wherein in a second operating mode, the switch control selectively connects the inboard distribution unit to a second generator output and the third switch to the second switch and selectively disconnects the first switch from the generator output to provide power to the one or more nacelle and/or wing located electrical loads from the outboard distribution unit via the second generator output and the inboard distribution unit; and
    wherein in a third operating mode, the switch control selectively connects the first switch to the generator line and selectively disconnects the second switch from the inboard distribution unit to transfer power directly from the generator output to the one or more nacelle and/or wing located electrical loads via the outboard distribution unit.

2. An apparatus according to claim 1, wherein the first, second, and third switches are controllable to allow operation in the first operating mode in which power is supplied to the inboard distribution unit via the outboard distribution unit, the second operating mode in which power is supplied from the inboard distribution unit to the outboard distribution unit, and the third mode in which no power is supplied between the inboard and outboard distribution units.

3. An apparatus according to claim 1, wherein the inboard distribution unit is located within an aircraft fuselage, the outboard distribution unit being located in or associated with a nacelle of the aircraft.

4. An apparatus according to claim 1, wherein the one or more nacelle and/or wing located electrical loads are transferred power from the outboard distribution unit via the generator output.

5. An apparatus according to claim 4, wherein the nacelle and/or wing located electrical loads include control and/or drive for an actuator, and/or operation of de-icing equipment.

6. An apparatus according to claim 1, further comprising a fourth switch connected between the inboard distribution unit and a second inboard distribution unit of a second power distribution apparatus.

7. An apparatus according to claim 6, wherein the switch control selectively connects the fourth switch to the second generator output associated with the second power distribution apparatus and the third switch to the second switch and selectively disconnects the first switch from the generator output to provide power to the one or more nacelle and/or wing located electrical loads from the second inboard distribution unit.

8. An apparatus according to claim 1, further comprising a generator control unit electrically connected to both of the generator output and the inboard distribution unit, the generator control unit being configured to control power being delivered from the generator output.

9. An apparatus according to claim 1, wherein the first operating mode is associated with a normal operation of the generator output.

10. An apparatus according to claim 1, wherein the second operating mode is associated with a failure of the generator output.

11. An apparatus according to claim 1, wherein the third operating mode is associated with a failure of the feeder cable.

* * * * *